US012420279B2

(12) United States Patent
Hayden et al.

(10) Patent No.: US 12,420,279 B2
(45) Date of Patent: Sep. 23, 2025

(54) DEVICES AND METHODS FOR SAMPLE ANALYSIS

(71) Applicant: ABBOTT LABORATORIES, Abbott Park, IL (US)

(72) Inventors: Mark A. Hayden, Vernon Hills, IL (US); Jeffrey B. Huff, Lincolnshire, IL (US); Nicholas John Collier, Burwell (GB); Karen Xin Zhou Yu, Cambridge (GB)

(73) Assignee: Abbott Laboratories, Abbott Park, IL (US)

( * ) Notice: Subject to any disclaimer, the term of this patent is extended or adjusted under 35 U.S.C. 154(b) by 829 days.

(21) Appl. No.: 17/540,944

(22) Filed: Dec. 2, 2021

(65) Prior Publication Data

US 2022/0088599 A1 Mar. 24, 2022

Related U.S. Application Data

(63) Continuation of application No. PCT/US2020/035973, filed on Jun. 3, 2020.

(60) Provisional application No. 62/856,563, filed on Jun. 3, 2019.

(51) Int. Cl.
*B01L 3/00* (2006.01)

(52) U.S. Cl.
CPC ... *B01L 3/502715* (2013.01); *B01L 3/502784* (2013.01); *B01L 2200/16* (2013.01); *B01L 2300/0645* (2013.01); *B01L 2300/0819* (2013.01)

(58) Field of Classification Search
CPC ..................... B01L 3/502792; B01L 3/502784
See application file for complete search history.

(56) References Cited

U.S. PATENT DOCUMENTS

| | | | |
|---|---|---|---|
| 2010/0032293 | A1 | 2/2010 | Pollack et al. |
| 2017/0241949 | A1 | 8/2017 | Bort et al. |
| 2018/0095067 | A1 | 4/2018 | Huff et al. |

FOREIGN PATENT DOCUMENTS

| | | | |
|---|---|---|---|
| CN | 101743304 | | 6/2010 |
| CN | 103562729 | | 2/2014 |
| EP | 1643231 | A1 | 4/2006 |
| EP | 2884272 | A1 | 6/2015 |
| JP | 2016 539631 | A | 12/2016 |

OTHER PUBLICATIONS

International Search Report and Written Opinion dated Sep. 16, 2020, corresponding to International Patent Application No. PCT/US2020/035973.

*Primary Examiner* — Natalia Levkovich
(74) *Attorney, Agent, or Firm* — Edward J. Baba; Andrew R. Guzman; Bozicevic, Field & Francis LLP

(57) ABSTRACT

Digital microfluidic and analyte detection device includes a first substrate and a second substrate aligned generally parallel to each other with a gap defined therebetween in side view. At least one of the first and second substrates has an electrode array configured to generate electrical actuation forces to urge at least one droplet within the gap along the at least one of the first substrate and the second substrate. The electrode array has a plurality of electrodes defining an electrode array area in plan view. At least one of the first substrate and the second substrate has a well array defining a well array area in plan view. The well array area is bounded within the electrode array area and overlapping a portion of each of the plurality of electrodes. The well array area overlaps less than 75% of the electrode array area in plan view.

21 Claims, 8 Drawing Sheets

DEVICES AND METHODS FOR SAMPLE ANALYSIS

CROSS-REFERENCE TO RELATED APPLICATIONS

This application claims the benefit of International Patent Application No. PCT/US2020/035973, filed on Jun. 3, 2020, which claims the benefit of U.S. Provisional Patent Application No. 62/856,563, filed on Jun. 3, 2019, which is incorporated by reference herein in its entirety.

BACKGROUND

Field of the Disclosed Subject Matter

The disclosed subject matter relates to devices, systems and methods for sample analysis, for example in an integrated device for performing analyte analysis.

Description of Related Art

Analytical devices often require manipulation of samples, for example biological fluids, to prepare and analyze discrete volumes of the samples. Digital microfluidics allows for manipulation of discrete volumes of fluids, including electrically moving, mixing, and splitting droplets of fluid disposed in a gap between two surfaces, at least one of the surfaces of which includes an electrode array coated with a hydrophobic and/or a dielectric material.

Such devices and systems are particularly beneficial in an integrated device for performing analyte analysis. Often digital microfluidics can be used to introduce a fluid, such as a sample or reagent, for example, into one or more wells for analysis. However, the presence of wells can impact surface properties of the device and the behavior of droplets moving across the device. For example, areas of a device with wells can impart increased surface tension forces or drag on a liquid droplet as compared to surrounding electrode array surfaces without wells. The increased surface tension forces or drag can prevent effective loading of fluids into the wells or pores, as fluid droplets tend to circumvent the wells and the associated elevated surface tension forces or become lodged, or pinned, on top of the well area.

As such, there remains a need for improvement of such devices and systems. Configuring the position, size, and orientation of wells relative to the device electrodes can minimize the impacts of the different surface properties created by the wells and facilitate effective loading of fluids into the wells.

SUMMARY

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes a digital microfluidic and analyte detection device. The device generally includes a first substrate and a second substrate aligned generally parallel to each other with a gap defined therebetween in side view. At least one of the first substrate and the second substrate has an electrode array configured to generate electrical actuation forces to urge at least one droplet within the gap along the at least one of the first substrate and the second substrate. The electrode array has a plurality of electrodes defining an electrode array area in plan view. At least one of the first substrate and the second substrate has a well array defining a well array area in plan view. The well array area is bounded within the electrode array area and overlaps a portion of each of the plurality of electrodes. The well array area overlaps less than 75% of the electrode array area in plan view.

Each of the plurality of electrodes can overlap less than 25% of the well array area. The electrode array can include a first electrode having a first electrode area in plan view, and a second electrode adjacent the first electrode and having a second electrode area in plan view. The first electrode area and the second electrode area can together define a substantially parallelogram shape in plan view with a longitudinal axis therethrough. The well array area can have a substantially rectangular shape with a diagonal axis therethrough between opposing corners. The diagonal axis of the well array area can be substantially parallel to or colinear with the longitudinal axis of the first electrode area and the second electrode area. A first portion of the well array area can overlap the first electrode area and a second portion of the well array area can overlap the second electrode area. The first portion can have a size substantially equal to the second portion.

The electrode array can further include a third electrode having a third electrode area in plan view and a fourth electrode having a fourth electrode area in plan view. The first electrode, the second electrode, the third electrode and the fourth electrode can in series define a path along which the droplet can engage the well array. Additionally or alternatively, the first electrode, the second electrode, the third electrode and the fourth electrode can together define a substantially square shape with a diagonal axis therethrough. The diagonal axis can be disposed at about a 45-degree angle relative a diagonal axis defined by the well array. The well array area can overlap a substantially-similar sized portion of each of the first electrode area, the second electrode area, the third electrode area, and the fourth electrode area.

The electrode array can be configured to urge the at least one droplet along a path, at least a portion of the at least one droplet making fluidic contact with at least one well of the well array. Additionally, or alternatively, the electrode array can be configured to urge the droplet contiguously about a peripheral portion of the well array. The electrode array can also be configured to urge the at least one droplet along a path from the first electrode to the second electrode, and at least a portion of a peripheral edge of the well array can be positioned at an angle of between 0 degrees and 55 degrees relative to the path.

The well array can include a plurality of femtoliter wells, and each femtoliter well can be configured to hold a single bead. The device can include at least one of a magnet and an electromagnet proximate the plurality of wells. At least one of the first substrate and the second substrate can include at least one of PET, PMMA, COP, COC, PC and glass. Additionally, the electrode array and the well array can both be defined in one of the first substrate or the second substrate.

In accordance with another aspect of the disclosed subject matter, an analyte detection module for performing analyte detection is provided. The analyte detection module generally includes a substrate having a first layer and a second layer. The first layer includes an electrode array configured to generate electrical actuation forces to urge at least one droplet along a surface of the substrate. The electrode array has a plurality of electrodes defining an electrode array area in plan view. The second layer has a well array defining a well array area in plan view. The well array area is bounded within the electrode array area and overlaps a portion of each of the plurality of electrodes. The well array area overlaps less than 75% of the electrode array area in plan view.

In accordance with another aspect of the disclosed subject matter, a method of loading liquid droplets into a well array of an analyte detection module is provided. The method includes introducing a parent droplet into a gap defined between a first substrate and a second substrate. At least one of the first substrate and the second substrate has an electrode array defined therein, the electrode array having an electrode array area in plan view. At least one of the first substrate and the second substrate has a well array defining a well array area in plan view, the well array area is bounded within the electrode array area and overlaps less than 75% of the electrode array area in plan view. The method further includes urging the parent droplet contiguously about a peripheral portion of the well array by the electrode array generating electrical actuation forces on the parent droplet to dispose at least a portion of the parent droplet in fluidic contact with at least one well in the well array. The method further includes populating the at least one well in the well array with at least one child droplet released from the parent droplet.

The parent droplet can be urged about the peripheral portion of the well array a number of continuous cycles within a range of 5 and 20 continuous cycles.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the disclosed subject matter. Together with the description, the drawings serve to explain the principles of the disclosed subject matter.

DESCRIPTION

Figure 1A:
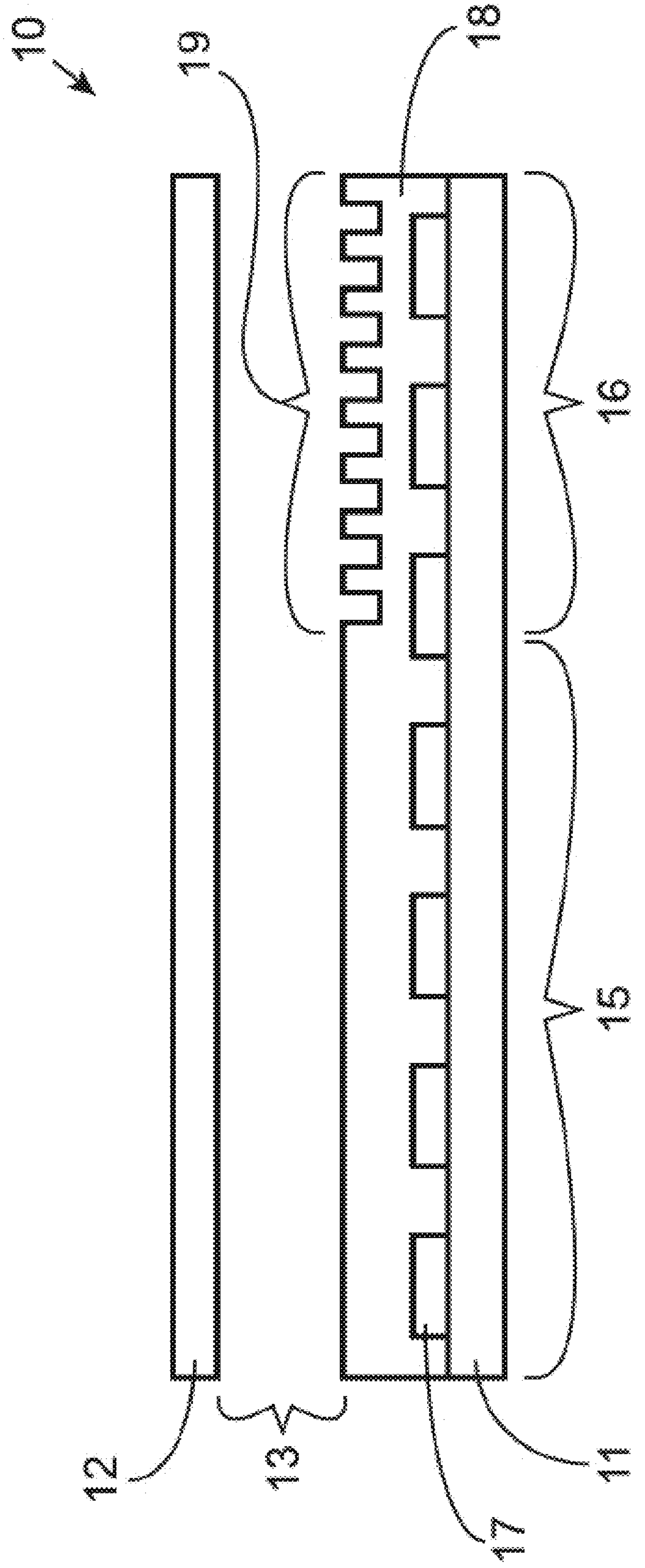
FIG. 1A is a schematic side view of an exemplary analyte detection module of an integrated digital microfluidic and analyte detection device in accordance with the disclosed subject matter.

Reference will now be made in detail to the various exemplary embodiments of the disclosed subject matter, exemplary embodiments of which are illustrated in the accompanying drawings. The structure and corresponding method of operation of and method of using the disclosed subject matter will be described in conjunction with the detailed description of the system.

Systems, devices, and method described herein relate to sample analysis, including in an integrated digital microfluidic and analyte detection device. As used interchangeably herein, "digital microfluidics (DMF)," "digital microfluidic module (DMF module)," or "digital microfluidic device (DMF device)" refer to a module or device that utilizes digital or droplet-based microfluidic techniques to provide for manipulation of discrete and small volumes of liquids in the form of droplets. Digital microfluidics uses the principles of emulsion science to create fluid-fluid dispersion into channels (e.g., water-in-oil emulsion), and thus can allow for the production of monodisperse drops or bubbles or with a very low polydispersity. Digital microfluidics is based upon the micromanipulation of discontinuous fluid droplets within a reconfigurable network. Complex instructions can be programmed by combining the basic operations of droplet formation, translocation, splitting, and merging.

Digital microfluidics operates on discrete volumes of fluids that can be manipulated by binary electrical signals. By using discrete unit-volume droplets, a microfluidic operation can be defined as a set of repeated basic operations, e.g., moving one unit of fluid over one unit of distance. Droplets can be formed using surface tension properties of the liquid. Actuation of a droplet is based on the presence of electrostatic forces generated by electrodes placed beneath the bottom surface on which the droplet is located. Different types of electrostatic forces can be used to control the shape and motion of the droplets. One technique that can be used to create the foregoing electrostatic forces is based on dielectrophoresis, which relies on the difference of electrical permittivities between the droplet and surrounding medium and can utilize high-frequency AC electric fields. Another technique that can be used to create the foregoing electrostatic forces is based on electrowetting, which relies on the dependence of surface tension between a liquid droplet present on a surface and the surface on the electric field applied to the surface.

As used herein, "sample," "test sample," or "biological sample" refer to a fluid sample containing or suspected of containing an analyte of interest. The sample can be derived from any suitable source. As embodied herein, the sample can comprise a liquid, fluent particulate solid, or fluid suspension of solid particles. As embodied herein, the sample can be processed prior to the analysis described herein. For example, the sample can be separated or purified from its source prior to analysis; however, as embodied herein, an unprocessed sample containing the analyte can be assayed directly. The source of the analyte molecule can be synthetic (e.g., produced in a laboratory), the environment (e.g., air, soil, fluid samples, e.g., water supplies, etc.), an animal (e.g., a mammal, reptile, amphibian or insect), a plant, or any combination thereof. For example and without limitation, as embodied herein, the source of an analyte is a human bodily substance (e.g., bodily fluid, blood, serum, plasma, urine, saliva, sweat, sputum, semen, mucus, lacrimal fluid, lymph fluid, amniotic fluid, interstitial fluid, lung lavage, cerebrospinal fluid, feces, tissue, organ, or the like). Tissues can include, but are not limited to skeletal muscle tissue, liver tissue, lung tissue, kidney tissue, myocardial tissue, brain tissue, bone marrow, cervix tissue, skin, etc. The sample can be a liquid sample or a liquid extract of a solid sample. In certain cases, the source of the sample can be an organ or tissue, such as a biopsy sample, which can be solubilized by tissue disintegration or cell lysis.

As embodied herein, and as described further herein, the integrated digital microfluidic and analyte detection device can have two modules: a sample preparation module and an analyte detection module. As embodied herein, the sample preparation module and the analyte detection module are separate or separate and adjacent. As embodied herein, the sample preparation module and the analyte detection module are co-located, comingled or interdigitated. The sample preparation module can include a plurality of electrodes for moving, merging, diluting, mixing, separating droplets of samples and reagents. The analyte detection module (or "detection module") can include a well array in which an analyte related signal is detected. As embodied herein, the detection module can also include the plurality of electrodes for moving a droplet of prepared sample to the well array. As embodied herein, the detection module can include a well array in a first substrate (e.g., upper substrate) which is disposed over a second substrate (e.g., lower substrate) separated by a gap. In this manner, the well array is in an upside-down orientation. As embodied herein, the detection module can include a well array in a second substrate (e.g., lower substrate) which is disposed below a first substrate (e.g., upper substrate) separated by a gap. As embodied herein, the first substrate and the second substrate are in a facing arrangement. A droplet can be urged (e.g., by electrical actuation) to the well array using electrode(s) present in the first substrate and/or the second substrate. As embodied herein, the well array including the region in between the wells can be hydrophobic. Alternatively, the plurality of electrodes can be limited to the sample preparation module and a droplet of prepared sample (and/or a droplet of immiscible fluid) can be urged to the detection module using other means.

Droplet-based microfluidics refer to generating and actuating (such as moving, merging, splitting, etc.) liquid droplets via active or passive forces. Examples of active forces include, but are not limited to, electric field. Exemplary active force techniques include electrowetting, dielectrophoresis, opto-electrowetting, electrode-mediated, electric-field mediated, electrostatic actuation, and the like or a combination thereof. For example, and as described further herein, the device can actuate liquid droplets across the upper surface of the first layer (or upper surface of the second layer, when present) in the gap via droplet-based microfluidics, such as, electrowetting or via a combination of electrowetting and continuous fluid flow of the liquid droplets. Alternatively, the device can include micro-channels to deliver liquid droplets from the sample preparation module to the detection module. As a further alternative, the device can rely upon the actuation of liquid droplets across the surface of the hydrophobic layer in the gap via droplet-based microfluidics. Electrowetting can involve changing the wetting properties of a surface by applying an electrical field to the surface and affecting the surface tension between a liquid droplet present on the surface and the surface. Continuous fluid flow can be used to move liquid droplets via an external pressure source, such as an external mechanical pump or integrated mechanical micropumps, or a combination of capillary forces and electrokinetic mechanisms. Examples of passive forces include, but are not limited to, T-junction and flow focusing methods. Other examples of passive forces include use of denser immiscible liquids, such as, heavy oil fluids, which can be coupled to liquid droplets over the surface of the first substrate and displace the liquid droplets across the surface. The denser immiscible liquid can be any liquid that is denser than water and does not mix with water to an appreciable extent. For example, the immiscible liquid can be hydrocarbons, halogenated hydrocarbons, polar oil, non-polar oil, fluorinated oil, chloroform, dichloromethane, tetrahydrofuran, 1-hexanol, etc.

In accordance with an aspect of the disclosed subject matter, a digital microfluidics and analyte detection device is provided. The device generally includes a first substrate and a second substrate aligned generally parallel to each other with a gap defined therebetween in side view. At least one of the first substrate and the second substrate has an electrode array configured to generate electrical actuation forces to urge at least one droplet within the gap along the at least one of the first substrate and the second substrate. The electrode array has a plurality of electrodes defining an electrode array area in plan view. At least one of the first substrate and the second substrate has a well array defining a well array area in plan view. The well array area is bounded within the electrode array area and overlaps a portion of each of the plurality of electrodes. The well array area overlaps less than 75% of the electrode array area in plan view.

The accompanying figures, where like reference numerals refer to identical or functionally similar elements throughout the separate views, serve to further illustrate various embodiments and to explain various principles and advantages all in accordance with the disclosed subject matter. For purpose of explanation and illustration, and not limitation, exemplary embodiments of the device for sample analysis, including in an integrated device for performing analyte analysis, in accordance with the disclosed subject matter are shown in FIGS. 1A-7.

FIG. 1A illustrates an exemplary analyte detection module of an integrated digital microfluidic and analyte detection device 10. The device 10 includes an analyte detection module including a first substrate 11 and a second substrate 12, where the second substrate 12 is aligned generally parallel to the first substrate with a gap 13 therebetween. As embodied herein, the second substrate 12 can be positioned over the first substrate 11, or alternatively, the second substrate 12 can be positioned below the first substrate 11. That is, it is recognized that the terms "first" and "second" are interchangeable and are merely used herein as a point of reference. As illustrated in FIG. 1A, the second substrate 12 can be the same length as the first substrate 11. Alternatively, the first substrate 11 and the second substrate 12 can be of different lengths.

At least one of the first substrate 11 and the second substrate 12 includes an electrode array defined therein. For example and without limitation, and as embodied herein, the first substrate 11 can include a plurality of electrodes positioned on the upper surface of the first substrate 11 to define the electrode array. The electrode array, for example and without limitation electrode arrays 200 or 400 shown in FIGS. 3-4B and discussed further herein, is configured to generate electrical actuation forces to urge at least one droplet along the at least one of the first substrate 11 and second substrate 12, as discussed further herein. Although the plurality of electrodes 17 are depicted in the first substrate 11, devices in accordance with the disclosed subject matter can have electrodes in either the first substrate 11, the second substrate 12, or in both of the first and second substrates.

Referring still to FIG. 1A, the device 10 can include a first portion 15, where liquid droplet, such as, a sample droplet, reagent droplet, etc., can be introduced onto at least one of the first substrate 11 and second substrate 12. The device 10 can include a second portion 16, towards which a liquid droplet can be urged. The first portion 15 can also be referred to as the sample preparation module and the second portion 16 can be referred to as the analyte detection module. For example, liquid can be introduced into the gap 13 via a droplet actuator (not illustrated). Alternatively, liquid can be into the gap via a fluid inlet, port, or channel. As discussed further herein, for example with respect to FIG. 6, the device 10 can include chambers for holding sample, wash buffers, binding members, enzyme substrates, waste fluid, etc. Assay reagents can be contained in external reservoirs as part of the integrated device, where predetermined volumes can be urged from the reservoir to the device surface when needed for specific assay steps. Additionally, assay reagents can be deposited on the device in the form of dried, printed, or lyophilized reagents, where they can be stored for extended periods of time without loss of activity. Such dried, printed, or lyophilized reagents can be rehydrated prior or during analyte analysis.

With further reference to FIG. 1A, a layer 18 of dielectric/hydrophobic material can be disposed on the upper surface of the first substrate. For example and not limitation, and as embodied herein, Teflon can be used as both the dielectric and hydrophobic material. However, any suitable material having dielectric and hydrophobic properties can be used, as described further herein. The layer 18 can cover the plurality of electrodes 17 in the electrode array. Alternatively, and shown for example in the exemplary device depicted in FIG. 1B, a layer 38 of dielectric material can be disposed on the upper surface of the first substrate and covering the plurality of electrodes 17 of the electrode array. A layer 34 of hydrophobic material can be overlaid on the dielectric layer 38. In this manner, any suitable combination of materials having dielectric and hydrophobic properties can be used to form layer 38 and layer 34, respectively, as described further herein.

Figure 1B:
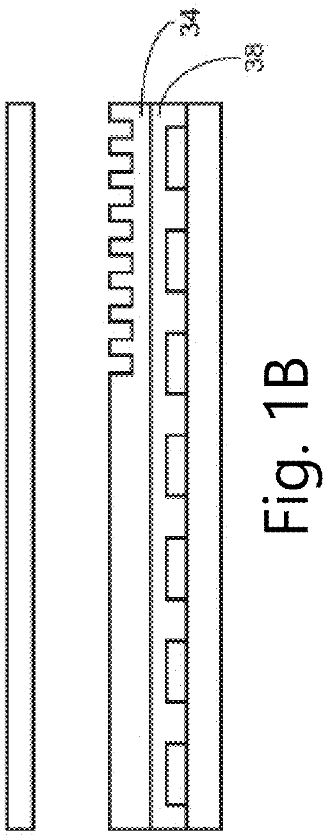
FIG. 1B is a schematic side view of another exemplary analyte detection module of an integrated digital microfluidic and analyte detection device in accordance with the disclosed subject matter.

At least one of the first substrate 11 and the second substrate 12 has a well array 19. For example and without limitation, and with reference to FIG. 1A, the well array 19 can be positioned in the layer 18 of the first substrate 11 in the second portion 16 of the device. With reference to FIG. 1B, the well array 19 can alternatively be positioned in the layer 34. While reference is made herein to the well array 19 in the first substrate 11, the well array 19 can be positioned on either the first substrate 11, the second substrate 12, or on both of the first and second substrates. As embodied herein, the plurality of electrodes 17 and the well array 19 can be defined in the same one of the first substrate or the second substrate. Alternatively, the plurality of electrodes 17 and the well array 19 can be defined in different substrates.

The first and second substrates can be made from a flexible material, such as paper (with ink jet-printed electrodes) or polymers, such as PET, PMMA, COP, COC, and PC. Alternatively, the first and second substrates can be made from a non-flexible material, such as for example, printed circuit board, plastic or glass. For purpose of illustration and not limitation, as embodied herein, one or both of the substrates can be made from a single sheet, which can undergo subsequent processing to create the plurality of electrodes. For example, one or more sets of the plurality of electrodes can be fabricated on a substrate which can be cut to form a plurality of substrates overlaid with a plurality of electrodes. For example, the electrodes can be bonded to the surface of the conducting layer via a general adhesive agent or solder.

The electrodes can be comprised of a metal, metal mixture or alloy, metal-semiconductor mixture or alloy, or a conductive polymer. Some examples of metal electrodes include copper, gold, indium, tin, indium tin oxide, and aluminum. For example, the dielectric layer comprises an insulating material, which has a low electrical conductivity or is capable of sustaining a static electrical field. For example, the dielectric layer can be made of porcelain (e.g., a ceramic), polymer or a plastic. The hydrophobic layer can be made of a material having hydrophobic properties, such as, for example, Teflon and generic fluorocarbons. In another example, the hydrophobic material can be a fluorosurfactant (e.g., FluoroPel). In embodiments including a hydrophilic layer deposited on the dielectric layer, the hydrophilic layer can be a layer of glass, quartz, silica, metallic hydroxide, or mica.

The plurality of electrodes can include a certain number of electrodes per unit area of the first substrate, which number can be increased or decreased based on size of the electrodes and a presence or absence of inter-digitated electrodes. Electrodes can be fabricated using a variety of processes including, photolithography, atomic layer deposition, laser scribing or etching, laser ablation, flexographic printing and ink-jet printing of electrodes. For example and not limitation, a special mask pattern can be applied to a conductive layer disposed on an upper surface of the first substrate followed by laser ablation of the exposed conductive layer to produce a plurality of electrodes on the first substrate.

Figure 2:
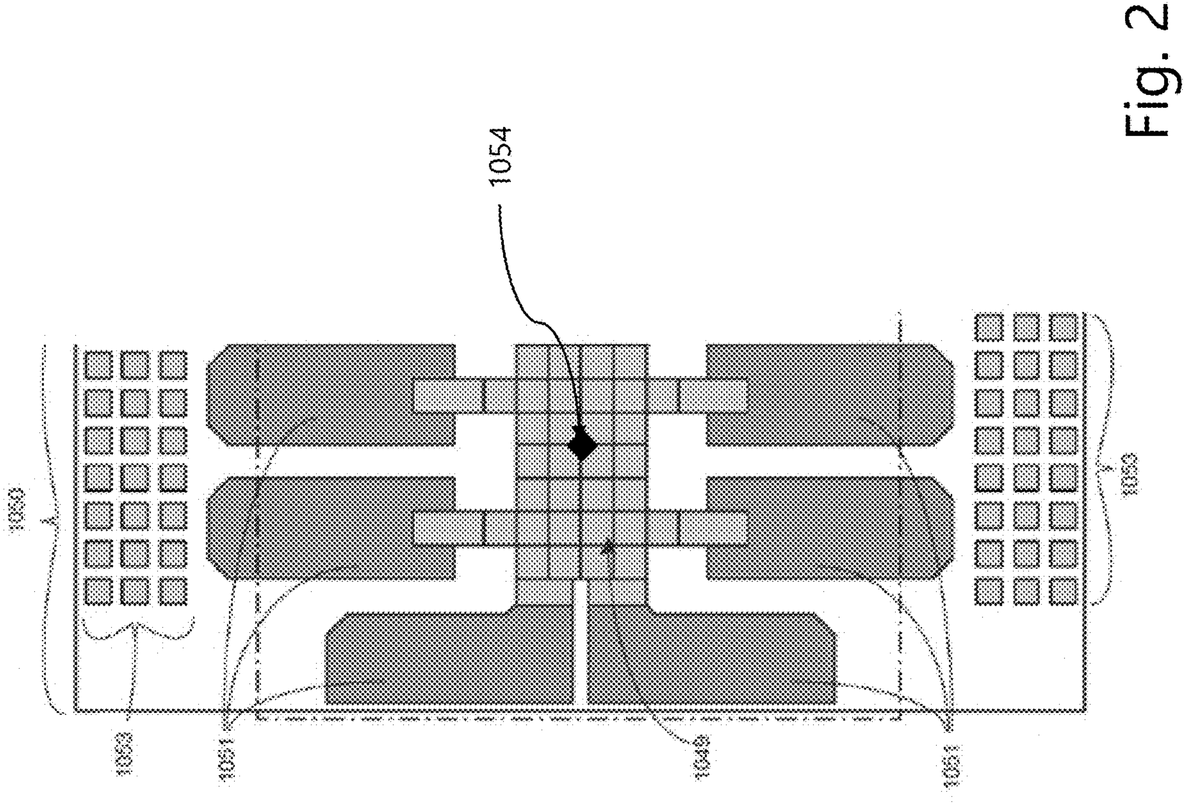
FIG. 2 is a schematic plan view of an exemplary embodiment of an integrated digital microfluidic and analyte detection device in accordance with the disclosed subject matter.

FIG. 2 is a plan view of an exemplary embodiment of an integrated digital microfluidic and analyte detection device in accordance with the disclosed subject matter. The digital microfluidics module is depicted with a plurality of electrodes forming an array of electrodes 1049 that are operatively connected to a plurality of reagent reservoirs 1051 which can be used for generation of droplets to be transported to the well array 1054. For example, one or more of the reservoirs 1051 can contain a reagent or a sample. Different reagents can be present in different reservoirs. Also depicted in the microfluidics module 1050 are contact pads 1053 that connect the array of electrodes 1049 to a power source (not shown). Trace lines connecting the array of electrodes 1049 to the contact pads are not depicted. The array of electrodes 1049 can transport one or more droplets, for example and not limitation, a buffer droplet or a droplet containing a buffer and/or a tag (such as and without limitation, a cleaved tag or dissociated aptamer) to the well array 1054.

For example and as embodied herein, the electrical potential generated by the plurality of electrodes urge liquid droplets, formed on an upper surface of the first layer (or the second layer when present) covering the plurality of electrodes, across the surface of the digital microfluidic device to be received by the well array. In this manner, each electrode can independently urge the droplets across the surface of the digital microfluidic device.

Figure 3:
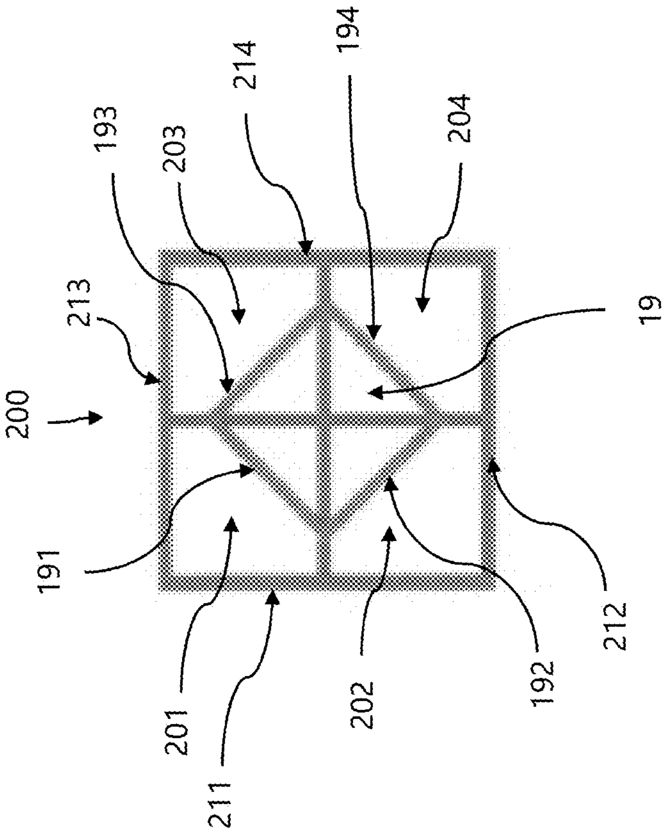
FIG. 3 is a partial schematic plan view of the analyte detection module of FIG. 1A.

Referring now to FIG. 3, the electrode array has an electrode array area in plan view. For example and without limitation, and as embodied herein, the electrode array 200 can have a substantially rectangular shape in plan view with four sides 211, 212, 213, and 214, and the electrode array area bounded within the perimeter of the area defined by the electrode array. As discussed further herein, the electrode array 200 can include a first electrode 201, a second electrode 202, a third electrode 203, and a fourth electrode 204, each respective electrode defining a region of the electrode array area. While electrode array 200 is shown having a substantially square shape, electrode arrays within the scope of the disclosed subject matter can have any shape. For example and without limitation, with reference to electrode array 400 shown in FIG. 4B, the electrode array can having a substantially rectangular shape. Additionally, or as a further alternative, an electrode array can define a non-linear perimeter, for example and without limitation, if the electrodes forming the electrode array are interdigitated with each other and/or with other electrodes formed on the substrate.

Referring again to FIG. 3, the well array 19 has a well array area in plan view. For example and without limitation, and as embodied herein, the well array 19 can have a substantially rectangular shape in plan view with four sides 191, 192, 193, and 194 forming a perimeter of the well array area. The well array 19 is disposed within the electrode array 200, with the well array area bounded within the electrode array area in plan view. As such, for purpose of illustration and not limitation, as embodied herein, the well array area overlaps less than 75% of the electrode array area in plan view. That is, as shown for example and without limitation, the well array area defined by sides 191, 192, 193, and 194 of the well array 19 overlaps less than 75% of the electrode array area defined by sides 211, 212, 213, and 214 of the electrode array 200 in plan view. For purpose of illustration and not limitation, as embodied herein, the well array area can overlap less than 75% of each electrode in the electrode array. For example and without limitation, as shown for example in FIG. 3, the well array area formed by each of sides 191, 192, 193, and 194 can overlap less than 75% of each of the first electrode 201, second electrode 202, third electrode 203, and fourth electrode 204, respectively.

In accordance with another aspect of the disclosed subject matter, an analyte detection module for performing analyte detection is provided. The analyte detection module generally includes a substrate having a first layer and a second layer. The first layer includes an electrode array configured to generate electrical actuation forces to urge at least one droplet along a surface of the substrate. The electrode array has a plurality of electrodes defining an electrode array area in plan view. The second layer has a well array defining a well array area in plan view. The well array area is bounded within the electrode array area and overlaps a portion of each of the plurality of electrodes. The well array area overlaps less than 75% of the electrode array area in plan view.

In accordance with another aspect of the disclosed subject matter, a method of loading liquid droplets into a well array of an analyte detection module is provided. The method includes introducing a parent droplet into a gap defined between a first substrate and a second substrate. At least one of the first substrate and the second substrate has an electrode array defined therein, the electrode array having an electrode array area in plan view. At least one of the first substrate and the second substrate has a well array defining a well array area in plan view, the well array area is bounded within the electrode array area and overlaps less than 75% of the electrode array area in plan view. The method further includes urging the parent droplet contiguously about a peripheral portion of the well array by the electrode array generating electrical actuation forces on the parent droplet to dispose at least a portion of the parent droplet in fluidic contact with at least one well in the well array. The method further includes populating the at least one well in the well array with at least one child droplet released from the parent droplet.

Figure 4A:
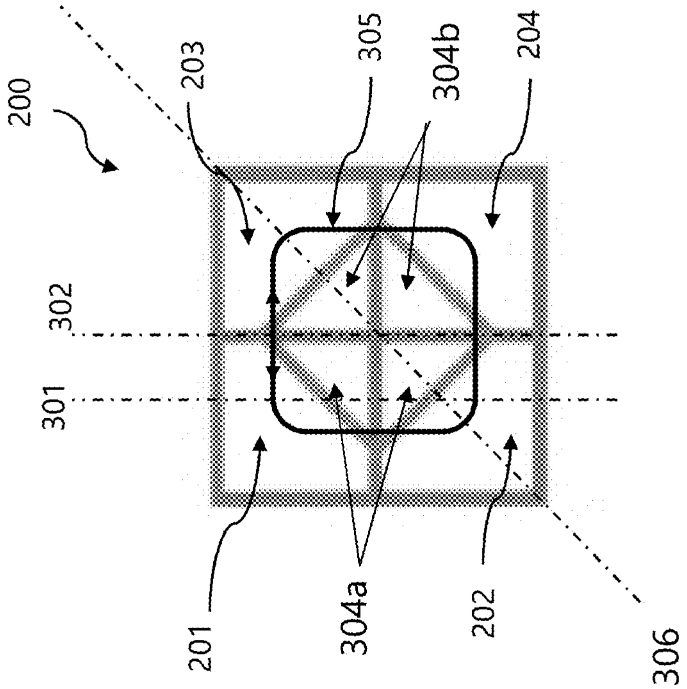
FIG. 4A is a partial schematic plan view of the analyte detection module of FIG. 1A.

Referring now to FIG. 4A, as embodied herein, electrode array 200 can include a first electrode 201 and a second electrode 202. The first electrode 201 can have a first electrode area in plan view and the second electrode 202 can have a second electrode area in plan view. For purpose of illustration and not limitation, and the first electrode area and the second electrode area can together define a substantially parallelogram shape with a longitudinal axis therethrough, and as embodied herein, the shape can be a substantially rectangular shape with the longitudinal axis therethrough. For purpose of illustration only and not limitation, a longitudinal axis 301 of the first electrode area and the second electrode area is depicted in broken line in FIG. 4A. Additionally, the well array 19 can define a well array area with a substantially rectangular shape in plan view with a diagonal axis therethrough between opposing corners. For purpose of illustration only, a diagonal axis 302 of the well array 19 is also depicted in broken line in FIG. 4A. The diagonal axis 302 of the well array 19 can be substantially parallel to or colinear with the longitudinal axis 301 of the first electrode area and the second electrode area. Additionally, or alternatively, and as further embodied herein, a first portion 304*a* of the well array 19 can overlap with the first electrode 201, and a second portion 304*b* of the well array 19 can overlap with the second electrode 202 in plan view. The first portion 304*a* of the well array 19 can have a size substantially equal to the second portion 304*b* of the well array 19.

With further reference to FIG. 4A, the electrode array 200 can also include a third electrode 203 and a fourth electrode 204. As embodied herein, the first electrode 201, second electrode 202, third electrode 203, and fourth electrode 204 can define a substantially square shape with a diagonal axis therethrough. Solely for purpose of illustration, and not limitation, a diagonal axis 306 is depicted in broken line in FIG. 4A. The diagonal axis 306 of the electrode array 200 can be disposed at an angle of approximately 45 degrees relative to the diagonal axis 302 of the area of the well array 19. As embodied herein, the well array 19 can overlap a substantially similar size portion of the areas of each of the first electrode 201, second electrode 202, third electrode 203, and fourth electrode 204.

Referring still to FIG. 4A, the first electrode 201, second electrode 202, third electrode 203, and fourth electrode 204 can in series define path 305 along which at least one droplet (not depicted) can be urged by electrical actuation forces of the electrode array. As the at least one droplet is urged along the path 305, at least a portion of the droplet can engage with at least a portion of the well array 19. For example, the electrode array 200 can be configured to urge a droplet along the path 305 with at least a portion of the droplet making fluidic contact with at least one well in the well array 19. Additionally or alternatively, the electrode array 200 can be configured to urge a droplet from the first electrode 201 to the second electrode 202 along the path 305. As embodied herein, at least a portion of a peripheral edge of the well array 19 can be angled between 0 degrees and 55 degrees relative to path 305, and can be angled approximately 45 degrees relative to path 305. As embodied herein, the peripheral edge of the well array 19 can be defined by the four sides 191, 192, 193, and 194.

Figure 4B:
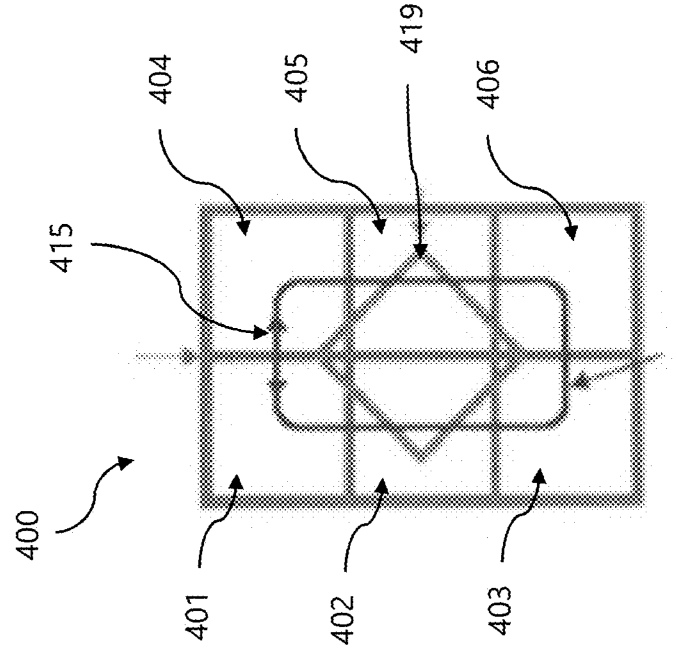
FIG. 4B is a partial schematic plan view of another exemplary analyte detection module in accordance with the disclosed subject matter.

With reference to FIG. 4B, an electrode array 400 having six electrodes is depicted. The first electrode 401, second electrode 402, third electrode 403, fourth electrode 404, fifth electrode 405, and sixth electrode 406 can define path 415 along which at least one droplet (not depicted) can be urged by electrical actuation forces of the electrode array. Electrode array 400 and well array 419 can have any features or combination of features of an electrode array and a well array described herein. For example, and as embodied herein, as at least one droplet (not shown) is urged along path 415, at least a portion of the droplet can engage with at least a portion of the well array 419.

Moving or urging a droplet along the path to dispose at least a portion of the droplet making fluidic contact with at least one well in the well array 19 can be performed to load liquid droplets into the well array. In accordance with the disclosed subject matter, a parent droplet can be urged contiguously about the peripheral portion of the well array 19 by generating electrical actuation forces with the electrode array 200, and at least one well in the well array 19 can be populated with at least one child droplet released from the parent droplet. The parent droplet can be urged in continuous cycles the peripheral portion of the well array. As embodied herein, the parent droplet can be urged contiguously about the peripheral portion of the well array 19 along path 305. For example and without limitation, the droplet can be urged around the peripheral portion of the well array within a range of 5 and 20 continuous cycles.

Figure 5:
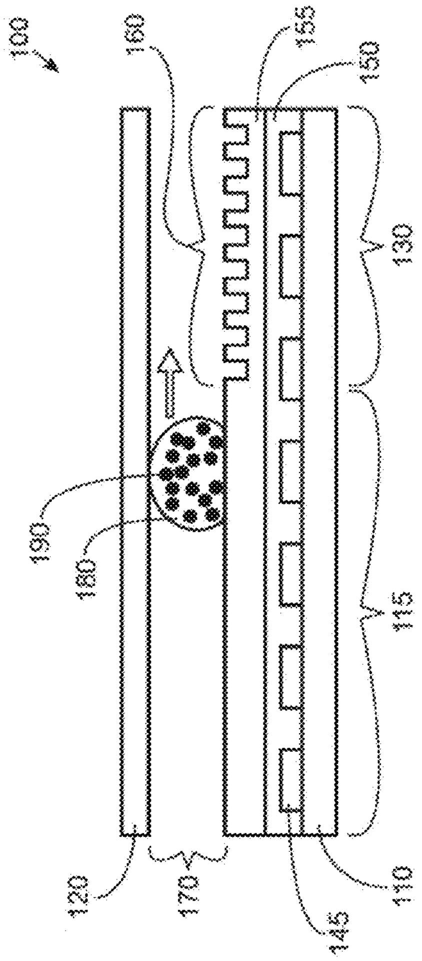
FIG. 5 is a schematic side view of the analyte detection module of FIG. 1A with a liquid droplet disposed therein.

FIG. 5 is a schematic side view of another exemplary integrated digital microfluidic and analyte detection device 100 with a liquid droplet 180 being urged in the gap 170, for purpose of illustration and not limitation. As embodied herein, the liquid droplet 180 can contain a plurality of beads or particles 190. The arrow indicates the direction of movement of the liquid droplet from the first portion 115 to the second portion 130, which contains the well array 160. Although beads or particles are illustrated here, the droplet can include analyte molecules instead of or in addition to the solid supports. Exemplary droplet configurations and contents are described, for purpose of illustration and not limitation, in U.S. Patent Application Publication No. 2018/0095067, which is incorporated by reference herein in its entirety.

In addition, or as an alternative, to moving aqueous-based fluids, immiscible fluids, such as organic based immiscible fluids, can also be urged by electrical-mediated actuation. Droplet actuation can be correlated with dipole moment and dielectric constant, which are interrelated, as well as with conductivity. As embodied herein, the immiscible liquid can have a molecular dipole moment greater than about 0.9 D, dielectric constant greater than about 3 and/or conductivities greater than about $10^{-9}$ S $m^{-1}$. Examples of use of the immiscible liquid in the analyte analysis assays disclosed herein include aiding aqueous droplet movement, displacing aqueous fluid positioned above the wells, displacing undeposited beads/particles/analyte molecules from the wells prior to optical interrogation of the wells, sealing of the wells, and the like. Some examples of organic-based immiscible fluids that are moveable in the devices disclosed herein include 1-hexanol, dichloromethane, dibromomethane, THF and chloroform. Organic-based oils that satisfy such criteria can also be moveable under similar conditions. As embodied herein, using immiscible fluid droplets, the gap/space in the device can be filled with air.

Figure 6:
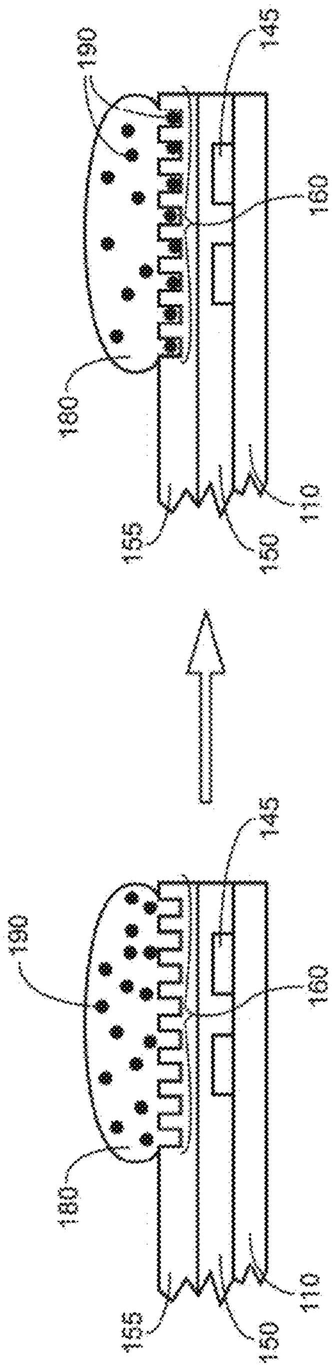
FIG. 6 is a schematic partial side view of the analyte detection module of FIG. 1A with a droplet containing particles or beads disposed on a well array.

FIG. 6 is a schematic partial side view of the device of FIG. 5 with the liquid droplet 180 containing beads or particles 190 positioned partially over the well array 160. As discussed above with reference to the exemplary embodiment of FIG. 4A, the droplet 180 can be continuously urged along a path with at least a portion of the droplet in fluidic contact with at least one well in the well array 160. Continuously moving the droplet along the path while maintaining fluidic contact with at least one well in the well array 160 can facilitate the deposition of the particles or beads 190 into the well array 160. The wells 160 can be dimensioned to contain one bead or particle 190 per well, or alternatively, can be dimensioned to contain a plurality of beads or particles 190 per well. Although beads or particles are depicted here, droplets containing any other contents, such as and without limitation analyte molecules, can also be moved as described herein. The wells 160 can also be dimensioned to contain one analyte molecule per well, or alternatively, can be dimensioned to contain a plurality of analyte molecules per well.

Figure 7:
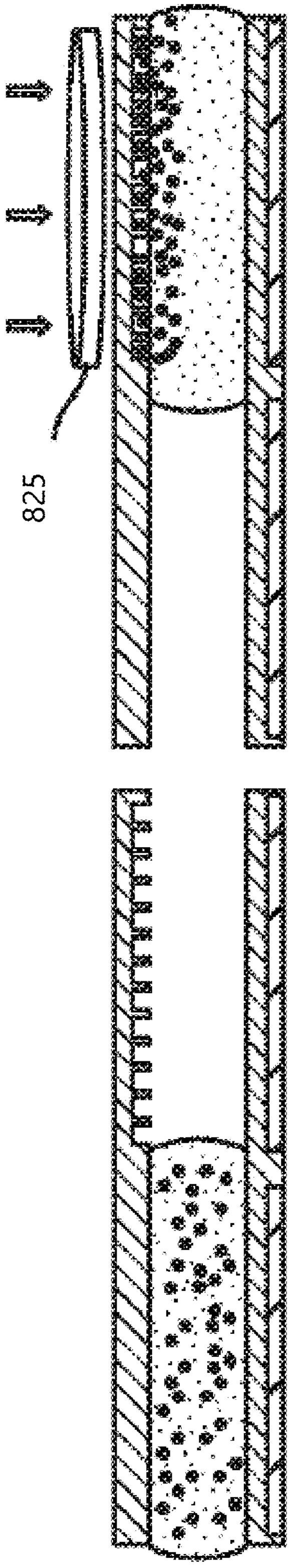
FIG. 7 is a schematic side view of another exemplary analyte detection module in accordance with the disclosed subject matter.

As shown for purpose of illustration only, and not limitation, with reference to FIG. 7, the beads or particles 190 can be magnetic, and a magnet or electromagnet 825 can be used to apply a force to the beads or particles 190, which can facilitate loading of the beads or particles 190 into wells 160. Exemplary techniques for loading beads, particles, or other droplet contents into wells are described, for purpose of illustration and not limitation, in U.S. Patent Application Publication No. 2018/0095067, which is incorporated by reference herein in its entirety.

As embodied herein, the fluid sample can be diluted prior to use in an assay. For example, in embodiments where the source of an analyte molecule is a human body fluid (e.g., blood, serum), the fluid can be diluted with an appropriate solvent (e.g., a buffer such as PBS buffer). A fluid sample can be diluted about 1-fold, about 2-fold, about 3-fold, about 4-fold, about 5-fold, about 6-fold, about 10-fold, about 100-fold, or greater, prior to use.

As embodied herein, the sample can undergo pre-analytical processing. Pre-analytical processing can offer additional functionality such as nonspecific protein removal and/or effective yet cheaply implementable mixing functionality. General methods of pre-analytical processing can include the use of electrokinetic trapping, AC electrokinetics, surface acoustic waves, isotachophoresis, dielectrophoresis, electrophoresis, or other pre-concentration techniques known in the art. As embodied herein, the fluid sample can be concentrated prior to use in an assay. For example, in embodiments where the source of an analyte molecule is a human body fluid (e.g., blood, serum), the fluid can be concentrated by precipitation, evaporation, filtration, centrifugation, or a combination thereof. A fluid sample can be concentrated about 1-fold, about 2-fold, about 3-fold, about 4-fold, about 5-fold, about 6-fold, about 10-fold, about 100-fold, or greater, prior to use.

As embodied herein, the analyte is not amplified (e.g., the copy number of the analyte is not increased) prior to the measurement of the analyte. For example, where the analyte is DNA or RNA, the analyte is not replicated to increase copy numbers of the analyte. As embodied herein, the analyte is a protein or a small molecule.

As used herein, the terms "droplet(s)" and "fluidic droplet(s)" are used interchangeably to refer to a discrete volume of liquid that is roughly spherical in shape and is bounded on at least one side by a wall or substrate of a microfluidics device. Roughly spherical in the context of the droplet refers to shapes such as spherical, partially flattened sphere, e.g., disc shaped, slug shaped, truncated sphere, ellipsoid, hemispherical, or ovoid. The volume of the droplet in the devices disclosed herein can range from about 10 μl to about 5 pL, such as, 10 μl-1 pL, 7.5 μl-10 pL, 5 μl-1 nL, 2.5 μl-10 nL, or 1 μl-100 nL, e.g., 10 μl, 5 μl, 1 μl, 800 nL, 500 nL, or less.

For example, the well array includes a plurality of individual wells. The well array can include a plurality of wells that can range from 10 to $10^9$ in number per 1 $mm^2$. As embodied herein, an array of about 100,000 to 500,000 wells (e.g., femtoliter wells) covering an area approximately 12 $mm^2$ can be fabricated. Each well can measure about 4.2 μm wide×3.2 μm deep (volume approximately 50 femtoliters) and can be capable of holding a single bead/particle (about 3 μm diameter). At this density, the femtoliter wells are spaced at a distance of approximately 7.4 μm from each other. For example, the well array can be fabricated to have individual wells with a diameter of 10 nm to 10,000 nm.

The placement of single beads, particles, analyte molecules or other suitable contents in the wells can allow for either a digital readout or analog readout. For example, for a low number of positive wells (<~70% positive) Poisson statistics can be used to quantitate the analyte concentration in a digital format; for high numbers of positive wells (>~70%) the relative intensities of signal-bearing wells are compared to the signal intensity generated from a single bead, particle or analyte molecule, respectively, and used to generate an analog signal. A digital signal can be used for lower analyte concentrations, whereas an analog signal can be used for higher analyte concentrations. A combination of digital and analog quantitation can be used, which can expand the linear dynamic range. As used herein, a "positive well" refers to a well that has a signal related to presence of a bead/particle/analyte molecule, which signal is above a threshold value. As used herein, a "negative well" refers to a well without a signal related to presence of a bead, particle or analyte molecule. As embodied herein, the signal from a negative well can be at a background level, e.g., below a threshold value.

The wells can be any of a variety of shapes, such as, cylindrical with a flat bottom surface, cylindrical with a rounded bottom surface, cubical, cuboidal, frustoconical, inverted frustoconical, or conical. As embodied herein, the wells can include a sidewall that can be oriented to facilitate the receiving and retaining of a microbead or microparticle present liquid droplets that have been urged over the well array. For example, the wells can include a first sidewall and a second sidewall, where the first sidewall can be opposite the second side wall. For example, and as embodied herein, the first sidewall is oriented at an obtuse angle with reference to the bottom of the wells and the second sidewall is oriented at an acute angle with reference to the bottom of the wells. The movement of the droplets can be in a direction parallel to the bottom of the wells and from the first sidewall to the second sidewall.

For example, the well array can be fabricated through one or more of molding, pressure, heat, or laser, or a combination thereof. For example, the well array can be fabricated using nanoimprint/nanosphere lithography. Other fabrication methods well known in the art can also be used. The integrated devices for performing analyte analysis, and the various components thereof, can be formed, for example and without limitation, using the materials and techniques described in U.S. Patent Application Publication No. 2018/0095067, which is incorporated by reference herein in its entirety.

The systems, devices, and methods described herein have demonstrated desired performance characteristics not achieved by conventional DMF analyte detection devices. The well array area can impart increased surface tension forces or drag on a liquid droplet as compared to the surrounding electrode array area. In traditional devices, the increased surface tension forces or drag of the well array area can prevent effective loading of fluids into the wells or pores, as fluid droplets tend to circumvent the well array area and the associated elevated surface tension forces or become lodged, or pinned, on top of the well array. Configuring the position, size, and orientation of the well array relative to the device electrodes can minimize the impacts of different substrate surface properties of the well array area and facilitate effective loading of fluids into the wells.

For example, configuring the size of the well array area to overlap less than 75% of the electrode array area in plan view can reduce the amount of a droplet that covers the well array area and allow more of the droplet to remain over the electrode array. Such a configuration can reduce the tendency of droplets to become pinned on top of the well array area and improve access of the droplet onto the well array. The orientation of the well array relative to the electrode array can similarly improve loading of fluids into the wells. For example, aligning a diagonal axis of the well array area substantially parallel to or colinear with a longitudinal axis of a first electrode area and a second electrode area can reduce the amount of a droplet that covers the well array area and allow more of the droplet to remain over the electrode array.

Urging a droplet contiguously about the peripheral portion of the well array with at least a portion of the droplet in fluidic contact with at least one well of the well array can similarly facilitate efficient loading of fluids into wells within the well array. Configuring the size of the well array area relative to the electrode array area and additionally or alternatively configuring the orientation of the well array relative to the electrode array can minimize pinning effects and allow a droplet to be urged contiguously about a periphery of the well array without becoming lodged on the well array. For example, such configurations can allow a droplet to be continuously cycled about the well array for 20 or more cycles.

For purpose of understanding and not limitation, data is provided to demonstrate various operational characteristics achieved by the systems, devices, and methods described herein. TABLE 1 describes the results of a bead loading analysis performed using a method of loading liquid droplets into a well array in accordance with the disclosed subject matter.

TABLE 1

| 100k beads | | |
|---|---|---|
| Wells | Filled wells | Percentage fill |
| 13165 | 12660 | 96.16% |
| 13211 | 13125 | 99.35% |
| 13425 | 13380 | 99.66% |
| 13637 | 13525 | 99.18% |
| 13752 | 13394 | 97.40% |
| 13218 | 13039 | 98.65% |
| 13443 | 12882 | 95.83% |
| 13615 | 13439 | 98.71% |
| 13443 | 12425 | 92.43% |

A plurality of wells were arranged with the peripheral edge of the well array angled at approximately 45 degrees relative to the path of droplet movement. The plurality of wells comprised 32K wells with 11 μm pitch. With reference to TABLE 1, the "Wells" column indicates the number of wells in the plurality of wells. The "Filled wells" column indicates the number of wells that were loaded with beads after a parent droplet containing beads suspended therein was urged contiguously about a peripheral portion of the well array with at least a portion of the parent droplet in fluidic contact with at least one well in the well array. The droplet urged about the well array contained 100K beads. The "Percentage fill" column of TABLE 1 describes the percentage of total wells in the well array that were filled with a bead. As described in TABLE 1, bead loading efficiencies of between approximately 92% and approximately 99% were achieved using the method of loading droplets into a well array in accordance with the disclosed subject matter. Similar results were observed using 70K beads.

According to other aspects of the disclosed subject matter, the analyte detection module of the digital microfluidic and analyte detection device described herein can be combined with a sample preparation module, for example and without limitation as described in U.S. Patent Application Publication No. 2018/0095067, which is incorporated by reference herein in its entirety.

As embodied herein, the sample preparation module can be used for performing steps of an immunoassay. Any immunoassay format can be used to generate a detectable signal which signal is indicative of presence of an analyte of interest in a sample and is proportional to the amount of the analyte in the sample.

As embodied herein, and as described further herein, the detection module includes the well array that are optically interrogated to measure a signal related to the amount of analyte present in the sample. The well array can have sub-femtoliter volume, femtoliter volume, sub-nanoliter volume, nanoliter volume, sub-microliter volume, or microliter volume. For example, the well array can be array of femtoliter wells, array of nanoliter wells, or array of microliter wells. As embodied herein, the wells in an array can all have substantially the same volume. The well array can have a volume up to 100 μl, e.g., about 0.1 femtoliter, 1 femtoliter, 10 femtoliter, 25 femtoliter, 50 femtoliter, 100 femtoliter, 0.1 pL, 1 pL, 10 pL, 25 pL, 50 pL, 100 pL, 0.1 nL, 1 nL, 10 nL, 25 nL, 50 nL, 100 nL, 0.1 microliter, 1 microliter, 10 microliter, 25 microliter, 50 microliter, or 100 microliter.

As embodied herein, and as described further herein, the sample preparation module and the detection module can both be present on a single base substrate and both the sample preparation module and the detection module can include a plurality of electrodes for moving liquid droplets. As embodied herein, such a device can include a first substrate and a second substrate, where the second substrate is positioned over the first substrate and separated from the first substrate by a gap. The first substrate can include a first portion (e.g., proximal portion) at which the sample preparation module is located, where a liquid droplet is introduced into the device, and a second portion (e.g., distal portion) towards which the liquid droplet is urged, at which second portion the detection module is located. As used herein, "proximal" in view of "distal" and "first" in view of "second" are relative terms and are interchangeable with respect to each other.

The space between the first and second substrates can be up to 1 mm in height, e.g., 0.1 μm, 0.5 μm, 1 μm, 5 μm, 10 μm, 20 μm, 50 μm, 100 μm, 140 μm, 200 μm, 300 μm, 400 μm, 500 μm, 1 μm-500 μm, 100 μm-200 μm, etc. The volume of the droplet generated and urged in the devices described herein can range from about 10 μl to about 5 picol, such as, 10 μl-1 picol, 7.5 μl-10 picol, 5 μl-1 nL, 2.5 μl-10 nL, or 1 μl-100 nL, 800-200 nL, 10 nL-0.5 μl e.g., 10 μl, 1 μl, 800 nL, 100 nL, 10 nL, 1 nL, 0.5 nL, 10 picol, or lesser.

As embodied herein, first portion and the second portion are separate or separate and adjacent. As embodied herein, the first portion and the second portion are co-located, comingled or interdigitated. The first substrate can include a plurality of electrodes overlaid on an upper surface of the first substrate and extending from the first portion to the second portion. The first substrate can include a layer disposed on the upper surface of the first substrate, covering the plurality of electrodes, and extending from the first portion to the second portion. The first layer can be made of a material that is a dielectric and a hydrophobic material. Examples of a material that is dielectric and hydrophobic include polytetrafluoroethylene material (e.g., Teflon®) or a fluorosurfactant (e.g., FluoroPel™). The first layer can be deposited in a manner to provide a substantially planar surface. A well array can be positioned in the second portion of the first substrate and overlying a portion of the plurality of electrodes and form the detection module. The well array can be positioned in the first layer. As embodied herein, prior to or after fabrication of the well array in the first layer, a hydrophilic layer can be disposed over the first layer in the second portion of the first substrate to provide a well array that have a hydrophilic surface. The space/gap between the first and second substrates can be filled with air or an immiscible fluid. As embodied herein, the space/gap between the first and second substrates can be filled with air.

As embodied herein, the sample preparation module and the detection module can both be fabricated using a single base substrate but a plurality of electrodes for moving liquid droplets can only be present only in the sample preparation module. As embodied herein, the first substrate can include a plurality of electrodes overlaid on an upper surface of the first substrate at the first portion of the first substrate, where the plurality of electrodes do not extend to the second portion of the first substrate. As embodied herein, the plurality of electrodes are only positioned in the first portion. A first layer of a dielectric/hydrophobic material, as described herein, can be disposed on the upper surface of the first substrate and can cover the plurality of electrodes. As embodied herein, the first layer can be disposed only over a first portion of the first substrate. Alternatively, the first layer can be disposed over the upper surface of the first substrate over the first portion as well as the second portion. A well array can be positioned in the first layer in the second portion of the first substrate, forming the detection module that does not include a plurality of electrodes present under the well array.

As embodied herein, the second substrate can extend over the first and second portions of the first substrate. As embodied herein, the second substrate can be substantially transparent, at least in region overlaying the well array. Alternatively, the second substrate can be disposed in a spaced apart manner over the first portion of the first substrate and cannot be disposed over the second portion of the first substrate, Thus, as embodied herein, the second substrate can be present in the sample preparation module but not in the detection module.

As embodied herein, the second substrate can include a conductive layer that forms an electrode. The conductive layer can be disposed on a lower surface of the second substrate. The conductive layer can be covered by a first layer made of a dielectric/hydrophobic material, as described herein. As embodied herein, the conductive layer can be covered by a dielectric layer. The dielectric layer can be covered by a hydrophobic layer. The conductive layer and any layer(s) covering it can be disposed across the lower surface of the second substrate or can only be present on the first portion of the second substrate. As embodied herein, the second substrate can extend over the first and second portions of the first substrate. As embodied herein, the second substrate and any layers disposed thereupon (e.g., conductive layer, dielectric layer, etc.) can be substantially transparent, at least in region overlaying the well array.

As embodied herein, the plurality of electrodes on the first substrate can be configured as co-planar electrodes and the second substrate can be configured without an electrode. The electrodes present in the first layer and/or the second layer can be fabricated from a substantially transparent material, such as indium tin oxide, fluorine doped tin oxide (FTO), doped zinc oxide, and the like.

As embodied herein, the sample preparation module and the detection module can be fabricated on a single base substrate. Alternatively, the sample preparation module and the detection modules can be fabricated on separate substrates that can subsequently be joined to form an integrated microfluidic and analyte detection device. As embodied herein, the first and second substrates can be spaced apart using a spacer that can be positioned between the substrates. The devices described herein can be planar and can have any shape, such as, rectangular or square, rectangular or square with rounded corners, circular, triangular, and the like.

While the disclosed subject matter is described herein in terms of certain preferred embodiments, those skilled in the art will recognize that various modifications and improvements can be made to the disclosed subject matter without departing from the scope thereof. Moreover, although individual features of one embodiment of the disclosed subject matter can be discussed herein or shown in the drawings of the one embodiment and not in other embodiments, it should be apparent that individual features of one embodiment can be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

The invention claimed is:

1. A digital microfluidic and analyte detection device, comprising:

a first substrate and a second substrate aligned generally parallel to each other with a gap defined therebetween in side view;

at least one of the first substrate and the second substrate having an electrode array configured to generate electrical actuation forces to urge at least one droplet within the gap along the at least one of the first substrate and the second substrate, the electrode array having a plurality of electrodes defining an electrode array area in plan view; and at least one of the first substrate and the second substrate having a well array defining a well array area in plan view, the well array area bounded within the electrode array area and overlapping at least a portion of each of the plurality of electrodes, wherein the well array area overlaps less than 75% of the electrode array area in plan view.

2. The device of claim 1, wherein each of the plurality of electrodes overlaps less than 25% of the well array area.

3. The device of claim 1, wherein the electrode array comprises:

a first electrode having a first electrode area in plan view, and a second electrode adjacent the first electrode and having a second electrode area in plan view, the first electrode area and the second electrode area together defining a substantially parallelogram shape in plan view with a longitudinal axis therethrough.

4. The device of claim 3, wherein the well array area has a substantially rectangular shape with a diagonal axis therethrough between opposing corners, the diagonal axis of the well array area being substantially parallel to or colinear with the longitudinal axis of the first electrode area and the second electrode area.

5. The device of claim 3, wherein a first portion of the well array area overlaps the first electrode area and a second portion of the well array area overlaps the second electrode area, the first portion having a size substantially equal to the second portion.

6. The device of claim 3, the electrode array further comprising a third electrode having a third electrode area in plan view and a fourth electrode having a fourth electrode area in plan view, wherein the first electrode, the second electrode, the third electrode and the fourth electrode in series define a path along which the droplet engages the well array.

7. The device of claim 6, wherein the first electrode, the second electrode, the third electrode and the fourth electrode together define a substantially square shape with a diagonal axis therethrough, the diagonal axis disposed at about a 45-degree angle relative a diagonal axis defined by the well array.

8. The device of claim 6, wherein the well array area overlaps a substantially-similar sized portion of each of the first electrode area, the second electrode area, the third electrode area, and the fourth electrode area.

9. The device of claim 6, wherein the electrode array is configured to urge the at least one droplet along the path, at least a portion of the at least one droplet making fluidic contact with at least one well of the well array.

10. The device of claim 6, wherein the electrode array is configured to urge the at least one droplet contiguously about a peripheral portion of the well array.

11. The device of claim 3, wherein the electrode array is configured to urge the at least one droplet along a path from the first electrode to the second electrode, and wherein at least a portion of a peripheral edge of the well array is angled between 0 degrees and 55 degrees relative to the path.

12. The device of claim 1, wherein the well array comprises a plurality of femtoliter wells, each femtoliter well configured to hold a single bead.

13. The device of claim 1, further comprising at least one of a magnet and an electromagnet proximate the plurality of wells.

14. The device of claim 1, wherein at least one of the first substrate or the second substrate comprises at least one of PET, PMMA, COP, COC, PC and glass.

15. The device of claim 1, wherein the electrode array and the well array are both defined in one of the first substrate or the second substrate.

16. An analyte detection module for performing analyte detection, comprising:

a substrate having:

a first layer including an electrode array configured to generate electrical actuation forces to urge at least one liquid droplet along a surface of the substrate, the electrode array having a plurality of electrodes defining an electrode array area in plan view; and a second layer having a well array defining a well array area in plan view, the well array area bounded within the electrode array area and overlapping at least a portion of each of the plurality of electrodes, wherein the well array area overlaps less than 75% of the electrode array area in plan view.

17. The analyte detection module of claim 16, wherein each of the plurality of electrodes overlaps less than 25% of the well array area.

18. The analyte detection module of claim 16, wherein the electrode array comprises:

a first electrode having a first electrode area in plan view, and a second electrode adjacent the first electrode and having a second electrode area in plan view, the first electrode area and the second electrode area together defining a substantially parallelogram shape in plan view with a longitudinal axis therethrough.

19. The analyte detection module of claim 18, wherein the well array area has a substantially rectangular shape with a diagonal axis therethrough between opposing corners, the diagonal axis of the well array area being substantially parallel to or colinear with the longitudinal axis of the first electrode area and the second electrode area.

20. The analyte detection module of claim 18, the electrode array further comprising a third electrode having a third electrode area in plan view and a fourth electrode having a fourth electrode area in plan view, wherein the first electrode, the second electrode, the third electrode and the fourth electrode in series define a path along which the droplet engages the well array.

21. The analyte detection module of claim 20, wherein the electrode array is configured to urge the at least one droplet contiguously about a peripheral portion of the well array.

* * * * *